US007926222B2

(12) United States Patent
Molnar et al.

(10) Patent No.: US 7,926,222 B2
(45) Date of Patent: Apr. 19, 2011

(54) INSECT ERADICATION SYSTEM AND METHOD

(76) Inventors: Christopher J. Molnar, Coraopolis, PA (US); Paul R. Rannick, Munhall, PA (US); Tom Jarzynka, Geneva, FL (US)

( * ) Notice: Subject to any disclaimer, the term of this patent is extended or adjusted under 35 U.S.C. 154(b) by 118 days.

(21) Appl. No.: 12/284,826

(22) Filed: Sep. 25, 2008

(65) Prior Publication Data

US 2010/0071258 A1 Mar. 25, 2010

(51) Int. Cl.
*A01M 1/20* (2006.01)
(52) U.S. Cl. .......................................... 43/132.1; 43/124
(58) Field of Classification Search ................ 43/132.1, 43/124, 130, 144, 125, 129; 392/365, 373, 392/349, 350; 219/385, 386, 536–541; 165/122
See application file for complete search history.

(56) References Cited

U.S. PATENT DOCUMENTS

| | | | | |
|---|---|---|---|---|
| 1,817,535 A * | 8/1931 | Spanel | ............................. | 43/124 |
| 1,948,228 A * | 2/1934 | Urban | ............................. | 43/132.1 |
| 2,467,393 A * | 4/1949 | Leher | ............................. | 43/132.1 |
| 2,469,963 A * | 5/1949 | Grosjean et al. | ............... | 43/124 |
| 3,029,332 A * | 4/1962 | Cotts | ............................. | 392/350 |
| 3,378,065 A * | 4/1968 | Mitchell et al. | ............... | 165/122 |
| 3,631,525 A * | 12/1971 | Brasch | ............................. | 392/350 |
| 3,731,057 A * | 5/1973 | Kunz et al. | .................... | 392/368 |
| 3,737,622 A * | 6/1973 | Hallgreen | .................... | 392/360 |
| 3,870,860 A * | 3/1975 | Steiner | ............................. | 392/351 |
| 3,924,099 A * | 12/1975 | Housel | ............................. | 165/122 |
| 4,476,920 A * | 10/1984 | Drucker et al. | ............... | 165/242 |
| 4,523,081 A * | 6/1985 | Geib et al. | .................... | 392/350 |
| 4,620,388 A * | 11/1986 | Imagawa | ........................ | 43/130 |
| 4,642,441 A * | 2/1987 | Kenyon | ........................ | 392/365 |
| 4,676,152 A * | 6/1987 | Tsuji et al. | ....................... | 99/468 |
| 4,692,593 A * | 9/1987 | Chiu | .............................. | 392/373 |
| 4,716,676 A * | 1/1988 | Imagawa | ........................ | 43/130 |
| 4,740,670 A * | 4/1988 | You | ............................... | 392/365 |
| 4,794,227 A * | 12/1988 | Antoniazzi et al. | ........... | 219/536 |
| 4,817,329 A * | 4/1989 | Forbes | .......................... | 43/132.1 |
| 4,958,456 A * | 9/1990 | Chaudoin et al. | ............. | 43/132.1 |
| 4,961,283 A * | 10/1990 | Forbes | .......................... | 43/132.1 |

(Continued)

FOREIGN PATENT DOCUMENTS

DE 19746026 A1 * 6/1998

(Continued)

OTHER PUBLICATIONS

International Search Report and Written Opinion, Application No. PCT/US2009/05279, dated Nov. 17, 2009 (10 pages).

(Continued)

*Primary Examiner* — Darren W Ark
(74) *Attorney, Agent, or Firm* — K&L Gates LLP (57) ABSTRACT

System, kit, and method for treating bed bugs or other pests in a room. The system comprises an electric heater that is formed by joining separate parts or sections. A first heater section may comprise a number of electrically energized heater coils and the second section may comprise a fan and a fan motor. The system may also comprise a number of temperature-sensing probes to be installed at locations within the room. The system may also comprise an electronic data recorder to receive and record temperature readings from the temperature-sensing probes. The room may be gradually heated to a temperature that is lethal for bed bugs and other pests. Once the lethal temperature is reached, the room may be heated for a time period.

24 Claims, 6 Drawing Sheets

U.S. PATENT DOCUMENTS

| | | | | |
|---|---|---|---|---|
| 4,989,363 A * | 2/1991 | Doernemann | | 43/132.1 |
| 4,989,364 A * | 2/1991 | Chaudoin et al. | | 43/132.1 |
| 5,083,011 A * | 1/1992 | Munroe | | 392/365 |
| 5,121,788 A * | 6/1992 | Carollo | | 165/122 |
| 5,131,461 A * | 7/1992 | Szucs | | 165/122 |
| 5,203,108 A * | 4/1993 | Washburn, Jr. | | 43/132.1 |
| 5,349,778 A * | 9/1994 | Chu | | 43/132.1 |
| 5,378,086 A * | 1/1995 | Campbell et al. | | 43/124 |
| 5,501,032 A * | 3/1996 | Pitman | | 43/132.1 |
| 5,678,352 A * | 10/1997 | Leitner et al. | | 43/124 |
| 5,792,419 A * | 8/1998 | Williamson et al. | | 43/124 |
| 5,805,767 A * | 9/1998 | Jouas et al. | | 392/365 |
| 6,141,901 A * | 11/2000 | Johnson et al. | | 43/132.1 |
| 6,146,600 A * | 11/2000 | Williamson | | 43/124 |
| 6,169,850 B1 * | 1/2001 | Menassa | | 392/350 |
| 6,233,397 B1 * | 5/2001 | Offir | | 392/373 |
| 6,279,261 B1 * | 8/2001 | Binker et al. | | 43/125 |
| 6,327,812 B1 * | 12/2001 | Hedman et al. | | 43/132.1 |
| 6,376,805 B2 * | 4/2002 | Faries et al. | | 219/385 |
| 6,447,737 B1 * | 9/2002 | Williamson et al. | | 43/124 |
| 6,588,140 B1 * | 7/2003 | Johnson et al. | | 43/132.1 |
| 6,612,067 B2 * | 9/2003 | Topp | | 43/124 |
| 6,678,994 B2 * | 1/2004 | Topp | | 43/124 |
| 6,772,829 B2 * | 8/2004 | Lebrun | | 165/122 |
| 6,840,256 B1 * | 1/2005 | Ryan et al. | | 43/125 |
| 6,892,491 B2 * | 5/2005 | Hedman | | 43/132.1 |
| 7,134,239 B2 * | 11/2006 | Barra | | 43/144 |
| 7,407,624 B2 * | 8/2008 | Cumberland et al. | | 422/28 |
| 7,435,378 B2 * | 10/2008 | Richardson et al. | | 43/124 |
| 7,690,148 B2 * | 4/2010 | Hedman | | 43/132.1 |
| 7,739,829 B2 * | 6/2010 | Chen et al. | | 43/132.1 |
| 7,837,932 B2 * | 11/2010 | Hedman | | 43/132.1 |
| 2001/0004813 A1 * | 6/2001 | Hedman | | 43/132.1 |
| 2001/0034963 A1 * | 11/2001 | Jones | | 43/124 |
| 2002/0066223 A1 * | 6/2002 | Hedman et al. | | 43/124 |
| 2002/0170227 A1 * | 11/2002 | Topp | | 43/124 |
| 2002/0189154 A1 * | 12/2002 | Hedman | | 43/132.1 |
| 2002/0194773 A1 * | 12/2002 | Topp | | 43/124 |
| 2003/0026727 A1 * | 2/2003 | Topp | | 43/124 |
| 2004/0025892 A1 * | 2/2004 | Kreyenberg | | 131/299 |
| 2004/0025893 A1 * | 2/2004 | Kreyenberg | | 131/299 |
| 2004/0028554 A1 * | 2/2004 | Hedman | | 422/1 |
| 2004/0028583 A1 * | 2/2004 | Hedman | | 422/307 |
| 2004/0035044 A1 * | 2/2004 | Topp | | 43/124 |
| 2005/0013727 A1 * | 1/2005 | Hedman | | 422/3 |
| 2005/0108920 A1 * | 5/2005 | Takenoshita et al. | | 43/132.1 |
| 2005/0220662 A1 * | 10/2005 | Hedman | | 422/1 |
| 2005/0246942 A1 * | 11/2005 | Mueller et al. | | 43/124 |
| 2007/0084105 A1 * | 4/2007 | Lindsay et al. | | 43/132.1 |
| 2007/0283986 A1 * | 12/2007 | Baum | | 43/124 |
| 2008/0014111 A1 * | 1/2008 | Hedman | | 422/3 |
| 2008/0148624 A1 * | 6/2008 | Borth et al. | | 43/132.1 |
| 2008/0260364 A1 * | 10/2008 | Vandrak et al. | | 392/365 |
| 2009/0071062 A1 * | 3/2009 | Hedman | | 43/132.1 |
| 2009/0211148 A1 * | 8/2009 | McCarty | | 43/124 |

FOREIGN PATENT DOCUMENTS

DE  19936417 A1 *  2/2001

OTHER PUBLICATIONS

"User Manual, ECR1 Paperless Recorder," Chromalox, Inc., 12th ed., Feb. 2006.

"Portable Industrial Unit Blower Air Heater, Types SDRA and SDRA-RG," Chromalox, Inc., 2006.

* cited by examiner

INSECT ERADICATION SYSTEM AND METHOD

BACKGROUND

Bed bugs are nocturnal insects that feed only on blood, mainly on the blood of humans. Bed bugs will suck blood from other animals, such as domestic pets, as well as pests such as birds and bats. They live in loose groups or individually and have a tendency to occupy cracks and crevices or other similar harborages. Bed bugs are stimulated to seek a host most likely by vibrations, body heat, and CO2 vapors. An inseminated adult female bed bug requires a blood meal within five days either before or after insemination for egg laying to occur. Once fed and inseminated, the female bed bug locates a suitable environment and deposits small, whitish eggs, which are attached with a cement-like material to surfaces in the cracks and crevices where they hide. Eggs can be found in caches in protected areas as well as individually in open spaces. Females typically lay 2-3 eggs per day and can lay 200 to 500 eggs in their lifespan. Under appropriate temperatures, eggs hatch after approximately 10 days but may be viable for as long as 28 days before hatching. Bed bug nymphs molt 5 times before reaching adulthood and require a blood meal prior to each molt. Adults can live without a meal for several months (in some reports, for more than a year) and nymphs for up to four months without feeding.

The time for development of each instar is dependant upon and available food source (host), temperature and humidity. With an available host, the ideal environment for development is 83° F. to 90° F. with 75% to 80% relative humidity. Under these conditions, all five nymph stages can be completed and sexual maturity reached in approximately 45-60 days. There is potential for 3-4 generations per year to be produced.

During the nymphal development stages, bed bugs may feed as frequently as once a day and usually feed at night when people are asleep; however, they will seek blood meals during the day under subdued or low light situations. It takes 3 to 12 minutes to feed to engorgement. To feed, the proboscis (piercing mouthpart) penetrates the skin and a feeding tube within the proboscis is extended and attached to a capillary. The person or animal being fed upon typically does not feel the penetration of the skin. The bed bug injects an anticoagulant into the wound to facilitate feeding. During the night, the insect may feed at several different points along the body before becoming fully engorged. Feeding is most often done horizontally across skin of the host as the insect travels along the sheets or other bedding. Bed bugs rest between feedings in protected areas near the location of a host awaiting a stimulus to signal them to seek their next meal. Under consistent moderate room temperatures and an adequate food supply bed bugs will live to 316 days. Low temperatures and/or an inconsistent food supply can actually extend the life span of stressed bed bugs up to 1 years as their metabolism slows (hibernation) and then returns to normal as temperatures rise or a host becomes available.

Bed bugs are of particular concern in the hospitality industry. A hotel's reputation for service and cleanliness is the driving factor in their quality rating and booking of room space. Therefore, bed bugs can be devastating to the hotel's reputation and create an immediate negative financial impact. While sanitation can play a role in the level of difficulty controlling a bed bug infestation, it has little to do with whether or not a customer may get them in the first place. Even so, the presence of bed bugs in a room is generally perceived by the public as an indication of improper sanitation and poor cleanliness.

Over the years, many techniques have been proposed for eliminating and preventing crawling insect pests such as cockroaches and ants in homes and businesses. These techniques focus on the minimal application of pesticides and placement of products in areas that humans and pets cannot come into contact with them. Unfortunately, these modern techniques have proven to be very ineffective against the common bed bug. Being blood feeders, bed bugs are not attracted to any current formulated baits, and currently there are no synthetic pheromones that could be used as attractants to traps, which further reduces the treatment strategies and options available to the modern pest management professional. The piercing mouthpart does not enable bed bugs to groom themselves or each other, which can limit effectiveness of dust formulations.

U.S. Pat. No. 6,141,901 discloses one prior art technique treating pests, including insects. The technique of this patent involves pumping heated outside air into the treatment zone (e.g., a structure) for a period of time. The outside air is heated to at least 200° F. and pumped into the structure until the temperature inside the structures rises, preferably at a rate of 10° F. per hour, until the temperature inside the structure reaches the lethal temperature, which, according to the patent, is usually about 120° F. to 130° F. for most pests.

U.S. Pat. No. 6,588,140 discloses another prior art technique for treating articles for pest infestation. In this patent, the articles to be treated are placed in an enclosure, which envelopes the articles. The enclosure is then sealed with a flexible, heat-resistant material, and hot air is pumped into the enclosure.

U.S. Pat. No. 6,327,812 discloses a process for killing organisms and removing toxins in an enclosure. In the process of this patent, temperature-sensing probes are installed within the enclosure. Hot air, produced by a heater external to the enclosure, is then introduced into the enclosure through one or more ingress ducts until the temperature within the enclosure reaches about 120° F.

Published U.S. patent application Pub. No. 2005/0220662 discloses a process for killing organisms, including bed bugs, in a room of a multi-room building. According to this published application, a heater is placed within the room of the building and heat sensitive articles within the room are removed. In addition, a number of temperature-sensing probes are positioned in the room. The heater then heats the ambient air within the room to a predetermined temperature, as measured by the temperature-sensing probes, of between 100° F. and 400° F.

SUMMARY

In one general aspect, the present invention is directed to systems and method for treating bed bugs or other pests in a room of a multi-room building, such as a hotel, apartment building, office building, etc. According to various embodiments, the system comprises an electric heater that is formed by joining separate parts or sections. A first heater section may comprise a number of electrically energized heater coils and the second section may comprise a fan and a fan motor. The fan motor is for powering the fan, and the first heater section is connectable to the second heater to form the electric heater to heat the room. The system may also comprise a number of temperature-sensing probes to be installed at locations within the room to measure the temperature in the room. The system may also comprise an electronic data recorder in communication with the plurality of temperature-sensing probes to receive and record temperature readings from the plurality of temperature-sensing probes.

The room may be gradually heated to a temperature that is lethal ("the lethal temperature") for bed bugs and other pests. According to various embodiments, the room may be heated so that the ambient air in the room is at least 120° F. and the temperature of structural voids in the walls, ceiling, etc., of the room is at least 111° F. Once the lethal temperature is reached, the room may be heated for a time period ("the treatment time period"), such as two to four hours or more, in order to kill the bed bugs and other pests in the room. After the treatment time period, the heater may be turned off and the room allowed to return to normal temperature.

According to various embodiments, the method may comprise preparing the room for treatment. Preparing the room for treatment may comprise, for example: (i) moving furniture to the center of the room and away from the walls; (ii) modifying or deactivating water sprinkler and smoke detection systems; and (iii) fully and tightly closing the windows of the room. The process of treating the room may also include placing the temperature-sensing probes at various strategic locations throughout the room. The plurality temperature-sensing probes are also in communication with a data recorder that records the temperature readings. The process also comprises connecting a first heater section to a second, separate, heater section to form an electric heater. The first heater section comprises a plurality of electrically energized heater coils, and the second heater section comprises a fan and a fan motor. In addition, the process comprises heating the room, with the electric heater, such that ambient air in the room is heated to at least 120° F. for a treatment time period and such that interior structural voids for the room exceed 111° F. for the treatment time period, wherein the treatment time period is at least four hours in various embodiments. In addition, during the heating process, the energy gain may be monitored through the data recorder and by having a human observer enter the room, make observations, and take surface temperatures at numerous different locations within the room (such as fifteen to twenty-five different locations). Such human observation may be done, for example, at one-hour intervals for the first four hours and at two-hour intervals after four hours.

In other general aspect, the present invention is directed to a kit used for treating rooms with heat for eradicating bed bugs and other pests. The kit may comprise, according to various embodiments: (i) a first heater section comprising a plurality of electrically energized heater coils; (ii) a second heater section, separate from the first heater second, that comprises a fan and a fan motor, wherein the fan motor is for powering the fan, and wherein the first heater section is connectable to the second heater to form an electric heater to heat the room; (iii) a plurality of temperature-sensing probes to be installed at locations within the room to measure the temperature in the room; and (iv) a data recorder for communicating with the plurality of temperature-sensing probes to receive and record temperature readings from the plurality of temperature-sensing probes.

FIGURES

Various embodiments of the present invention are described herein by way of example in conjunction with the following figures, wherein.

DESCRIPTION

The present invention is directed generally to systems and methods for treating a room for pests. The pests may be, for example, bed bugs or other insects or microorganisms. Preferably, the treatment of the room kills or eradicates most if not all of the pests in the room. In addition, the room is preferably a room of a multi-unit or multi-room building, such as a hotel, hospital, office building, etc. That way, the process can be used to treat individual rooms of the building rather than the entire building at once. In addition, although the description herein is generally directed to embodiments where one room in a multi-unit or multi-room building, the invention is not so limited and the heating process could be used in various embodiments to treat individual structures, such as single-family residences, etc.

The pest eradication process involves heating the ambient air in the room. The heating may be performed, in various embodiments, by an electric heater. The electric heater may comprise two or more separate sections that can be transported separately, but combined or connected together to form a functioning electric heater. Employing multiple separate sections has the advantage that the separate sections can be significantly lighter than the whole heater, making the heater sections easier to transport to rooms on upper levels of buildings. In addition, as described below, in various embodiments one section of the heater may comprise a fan and fan motor, and another section may comprise the heater assembly, including a number of heater coils. Certain heater coils may be rated for certain input voltage sources. Sectioning the heater from the fan motor unit also allows for customization of the heater coils to match available power sources (e.g., power sources of 110V, 208V, 220V, 240V, 277V, etc.), with the recognition that the ohm rating of the coils limits the power selections. Once the separate heater sections have been transported to the treatment area (e.g., the area or room to be treated), the heater can be assembled from the various sections.

Figures 1, 2:
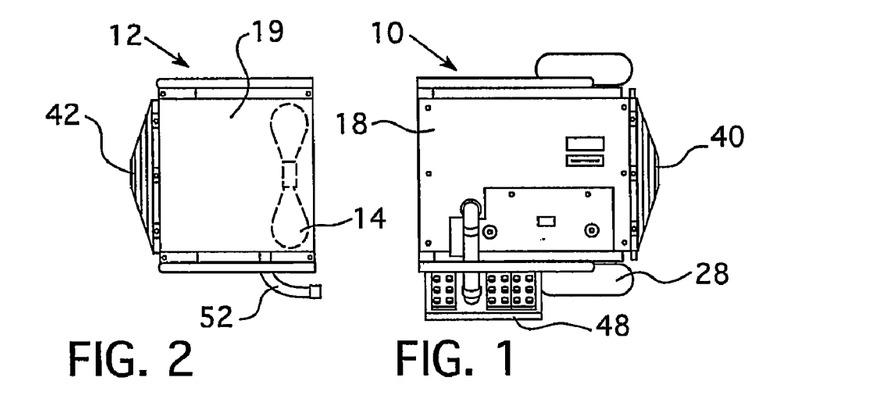
FIG. 1 is diagram of a first section of a heater according to various embodiments of the present invention.
FIG. 2 is diagram of a second section of a heater according to various embodiments of the present invention.
Figure 5:
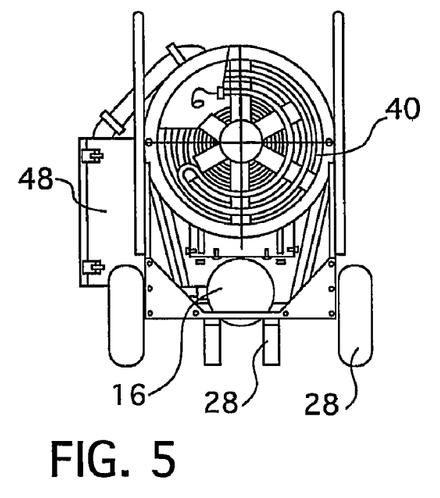
Figure 6:
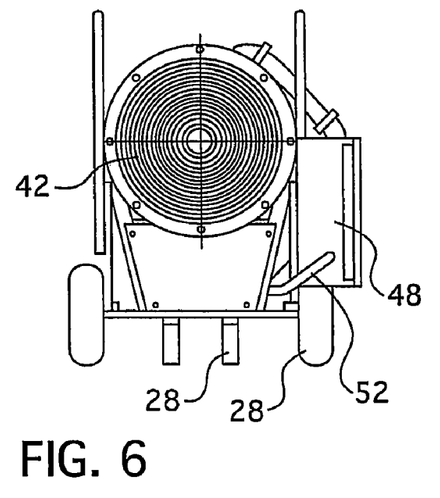
Figure 7:
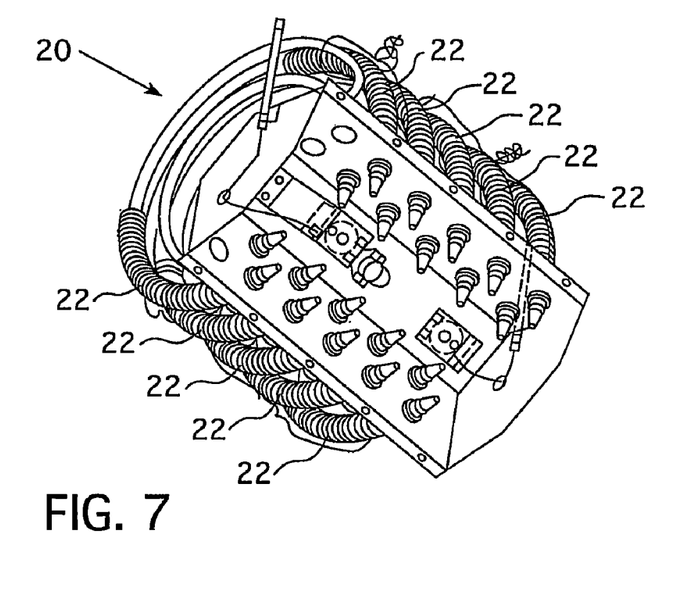
FIG. 7 is a diagram of a heater element, comprise a number of heater coils, according to various embodiments of the present invention.

FIGS. 1-7 show aspects of the electric heater according to various embodiments of the present invention. In the illustrated embodiment, the heater comprises two separate sections. FIG. 1 shows a first or front section 10 of the heater and FIG. 2 shows a second or rear section 12 of the heater. Both sections 10, 12 may comprise generally cylindrical bodies 18, 19, which may be made of metal, for example. The second section 12 may comprise a belt-driven fan 14 and an electric motor 16 for powering the fan 14 by driving the belt. The fan 14 may be located in the body 19 of the second section 12, and the motor 16 may be located under the body 19 (shown in FIGS. 4 and 5). The first section 10 may comprise a number of electrically energizable heater coils, which when electrically energized produce heat. The first section 10 may comprise, for example, ten to twenty separate heater coils. FIG. 7 shows an embodiment of a heater assembly 20 comprising ten heater coils 22. As described further below, certain of the coils 22 may be connected to and electrically energized by various input power sources to the heater 24. The heater assembly 20 may be enclosed within the body 18 of the first section 10.

Figure 3:
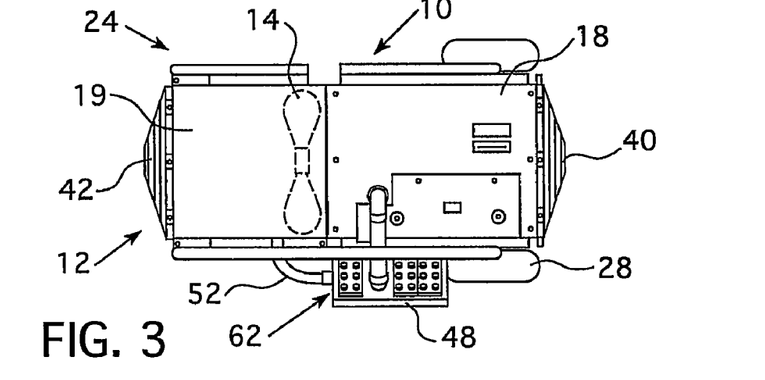
FIGS. 3-6 are views of an assembled heater according to various embodiments of the present invention.
Figure 4:
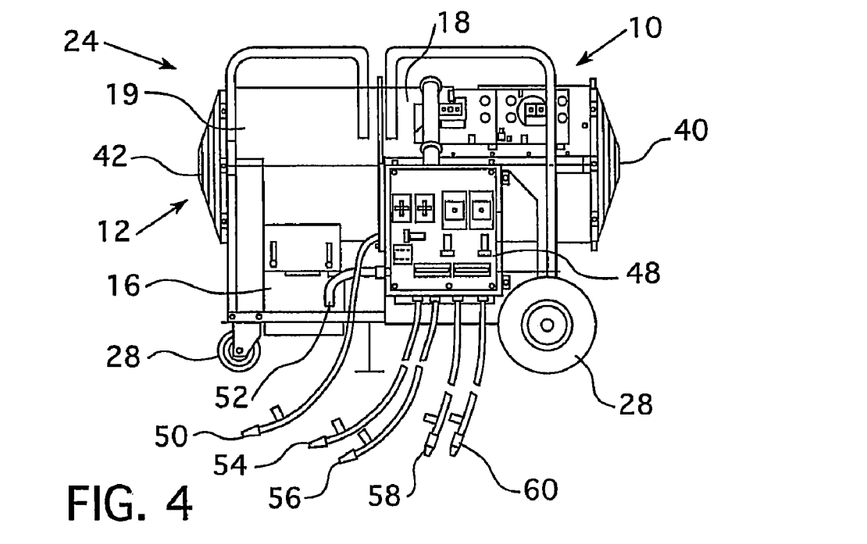

FIG. 3 is a top view of the electric heater 24 with the first and second sections 10, 12 connected to form the functional heater, and FIG. 4 shows a side view of the heater 24 with the first and second sections 10, 12 connected. The first and second sections 10, 12 may be connected using, for example, conventional connecting means, such as nuts/bolts, etc. For example, the bodies 18, 19 may each include rims on their connecting ends that may be connected using nuts and bolts, or any other suitable connectors. As shown in FIGS. 3 and 4, each section 10, 12 may have one or more sets of wheels 28 to facilitate transporting the sections 10, 12. Also, the sections 10, 12 may comprise feet 30 for supporting the end of the sections 10, 12 that do not have the wheels 28. In other embodiments, one or both of the sections 10, 12 could have two sets of wheels, with one set at each end of the section 10, 12.

FIGS. 5 and 6 show front and back views of the heater 24 according to various embodiments. As shown in these figures, the first section 10 may include a front grill 40 through which hot air from the heater 24 can be blown. In addition, the second section 12 may include a rear intake grill 42 through which the fan 14 may pull ambient air for heating by the heater assembly 20.

Figure 11:
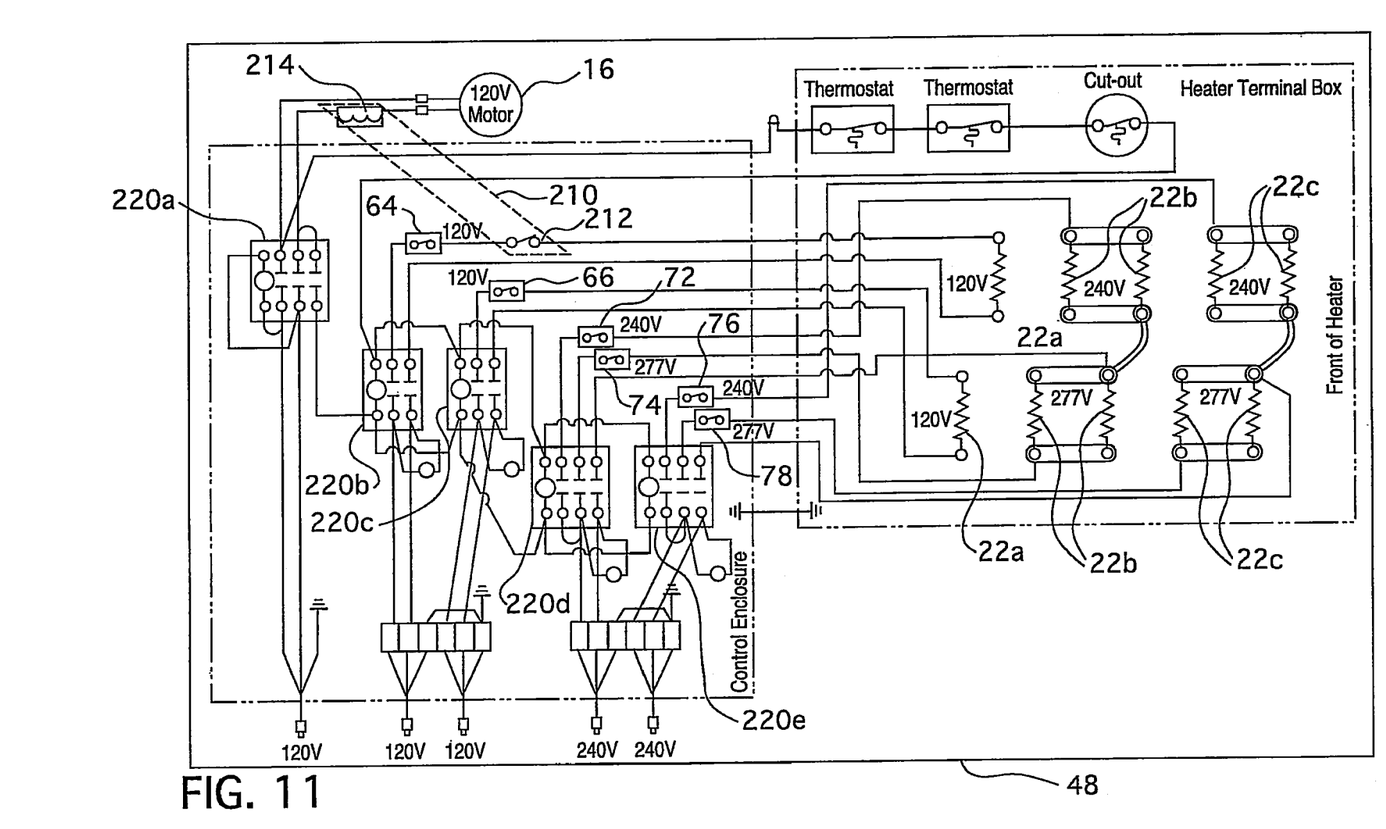
FIG. 11 is a wiring diagram of the heater according to various embodiments of the present invention.

The heater 24 may also include a power box 48. In the illustrated embodiment, the power box 48 is connected to the body 18 of the first heater section 10, although in other embodiments, the power box 48 could be connected to the body 19 of the second heater section 12. The power box 48 may comprise, for example, five separate electrical power circuits 220*a-e*, shown in FIG. 11. The first power circuit 220*a* provides electric power to the motor 16. In the illustrate embodiment, the first power circuit 220*a* is for powering the motor 16 from a 120V power source. Also in the illustrate embodiment, the second and third power circuits 220*b-c* are for powering individual, respective, 120V coils 22*a* from 120V input sources. The fourth and fifth power circuits 220*d-e* may be used for different input voltage sources, such as 208/240 or 277V. The fourth power circuit 220*d* may energize, for example, four (4) heater coils 22*b*, and the fifth power circuit 220*e* also may energize four (4) heater coils 22*c*, as shown in the example of FIG. 11.

This way, depending on the available power sources, different combinations of heater coils 22 could be used to heat the room. For example, if three 120V power sources were available in the room and no higher rated power sources were available, the three 120V power sources could be used to power the motor 16 and the two 120V coils 22*a* (via the power circuits 220*b* and 220*c*). If, for example, only one 120V source was available but two 208/240 or 277V sources were available, the 120V source could be used to power the motor 16 and the two 208/240 or 277V sources could be used to power the heater coils 22*b-c* (via the power circuits 220*d-e*). The 120V source in this example could be from a discrete generator or a wall outlet. If a sufficient number of 120V and 208/240 or 277V sources were available, all of the heater coils 22*a-c* could be energized.

Figure 8:
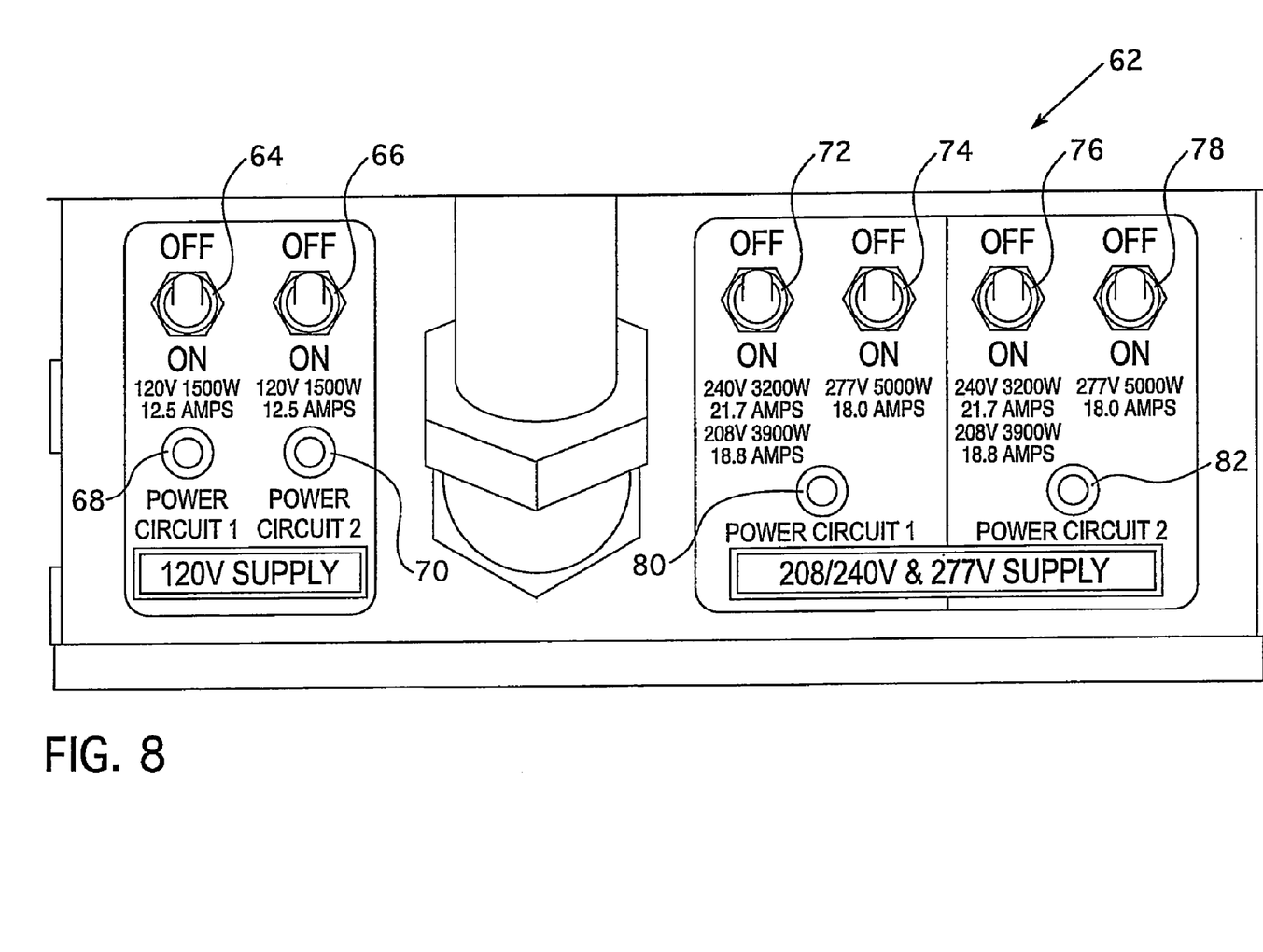
FIG. 8 is a diagram of a control panel of the heater according to various embodiments of the present invention.

In addition, with reference to FIG. 8, the power circuits could be controlled by switches 64-66 and 72-78 on a control panel 62, which may be located on the upper surface of the power box 48, for example, as shown in FIG. 3. For example, using switches 64 and 66, the user could turn on or off the 120V power circuits 220*b-c*. Whether the power circuits 220*b-c* are operational or not may be indicated by indicator lights 68, 70 respectively. Similarly, using switches 72-78, the user could turn on or off the power circuits 220*d-e*, and could also choose whether they are to be powered by 208/240V or 277V sources. Whether the power circuits 220*d-e* are operational or not may be indicated by indicator lights 80, 82 respectively As shown in FIG. 4, the heater 24 may include five (5) external power cords. The first external power cord 50 may connect to the power circuit 220*a* that is used to provide electrical power to the motor 16. The first power cord 50 may be connected to the power box 48, and a conduit 52 may carry the power cables from the power box 48 to the motor 16. The motor 16 may run on 120V, for example. As such, the first power cord 50 may be plugged into a conventional 120V wall outlet or to a 120V generator.

The second two power cords 54, 56 may be used for 120V power sources, and may be connected to the two power circuits 220*b-c* of the power box 48 used to power the 120V heater coils 22*a* respectively. The other two power cords 58, 60, may be connected to the two power circuits 220*d-e* of the power box 48 and used to power the heater coils 22*b-c* respectively, but may be used for differently rated power sources, such as 240V and/or 277V, or any other voltage rating.

In addition, the power box 48, as shown in FIG. 11, may comprise relays or other lockouts 210 for preventing the heater coils 22 from being energized unless the fan motor 16 is energized. Using the relay-type lockout 210 shown in FIG. 11, the pole 212 is closed when the motor 16 is energized via the inductive coupling from the inductor 214, allowing the heater coil 22*a* to be energized only when the motor 16 is energized. For simplicity, only one lockout 210 is shown in FIG. 11, although the heater 24 may include as many lockouts as needed to prevent the heater coils from being energized give the number of power circuits used in the heater 24.

Because the first (or "heater") section 10 of the heater 24 containing the heater coils 22 is separate from the second (or "fan/motor") section 12 containing the fan 14 and the motor 16, in various embodiments, the user(s) of the heater 24 may have multiple different heater sections 10 available for selection and use depending on the available power sources. For example, the user(s) could have one heater section 10 with some 120V heater coils (as shown in the embodiment described above) and could have a second heater section 10 with no 120V heater coils but instead all higher voltage rated heater coils, such as 208/240V. If the user(s) knows that there are some available 120V sources and some higher rated sources for the higher rated heater coils 22*b-c*, the user could select to use the first heater section 10 in order to user the 120V heater coils. Conversely, if the user knows that only 208/240V sources are available in the room, the user(s) could select the second heater section 10 (the one with only 208/240V heater coils). In this scenario, a generator could be used to power the motor 16. Of course, different combinations of voltage rated heater coils could be used in the different heater sections 10 to provide the user with multiple options. For example, some heater sections 10 may be designed for U.S. power systems and some heater sections 10 may be designed for use in European environments.

Figure 9:
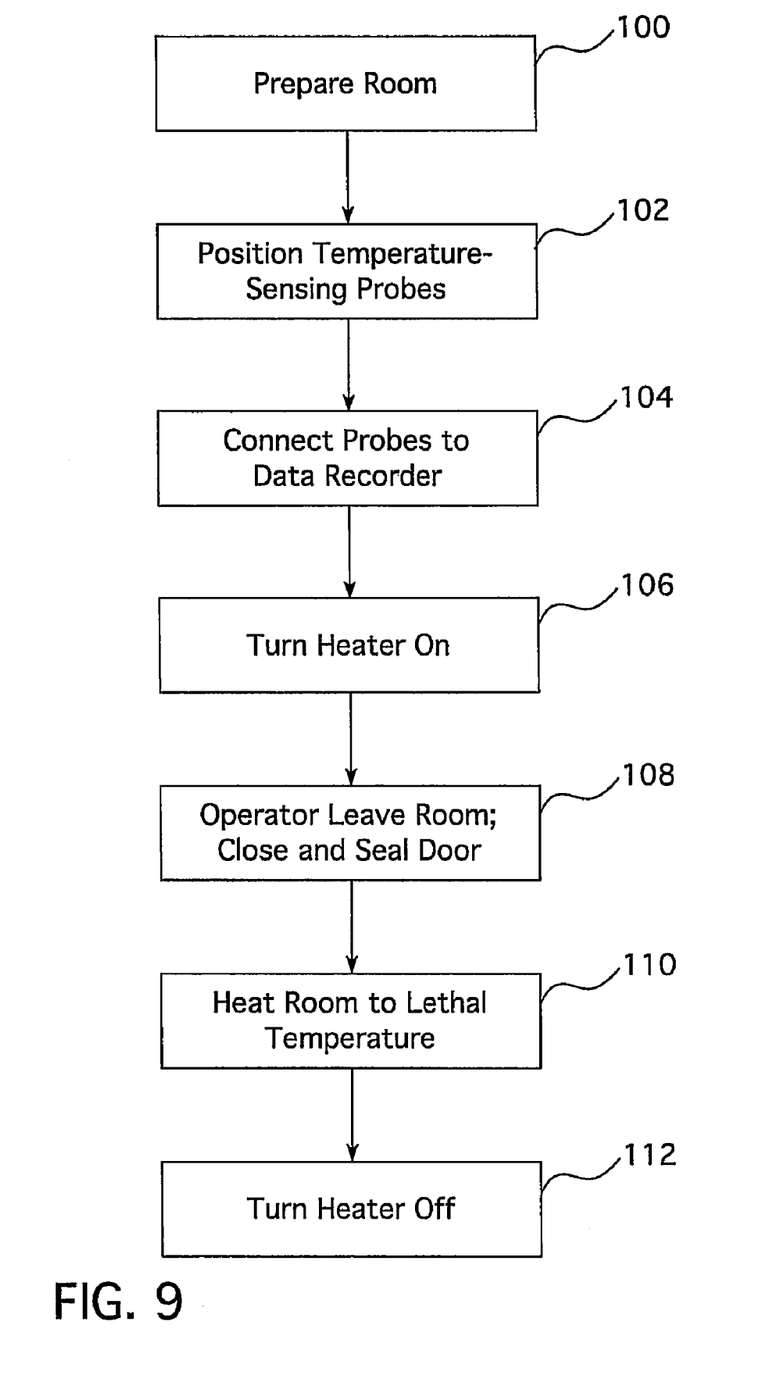
FIG. 9 is a flowchart illustrating a process for treating a room according to various embodiments of the present invention.
Figure 10:
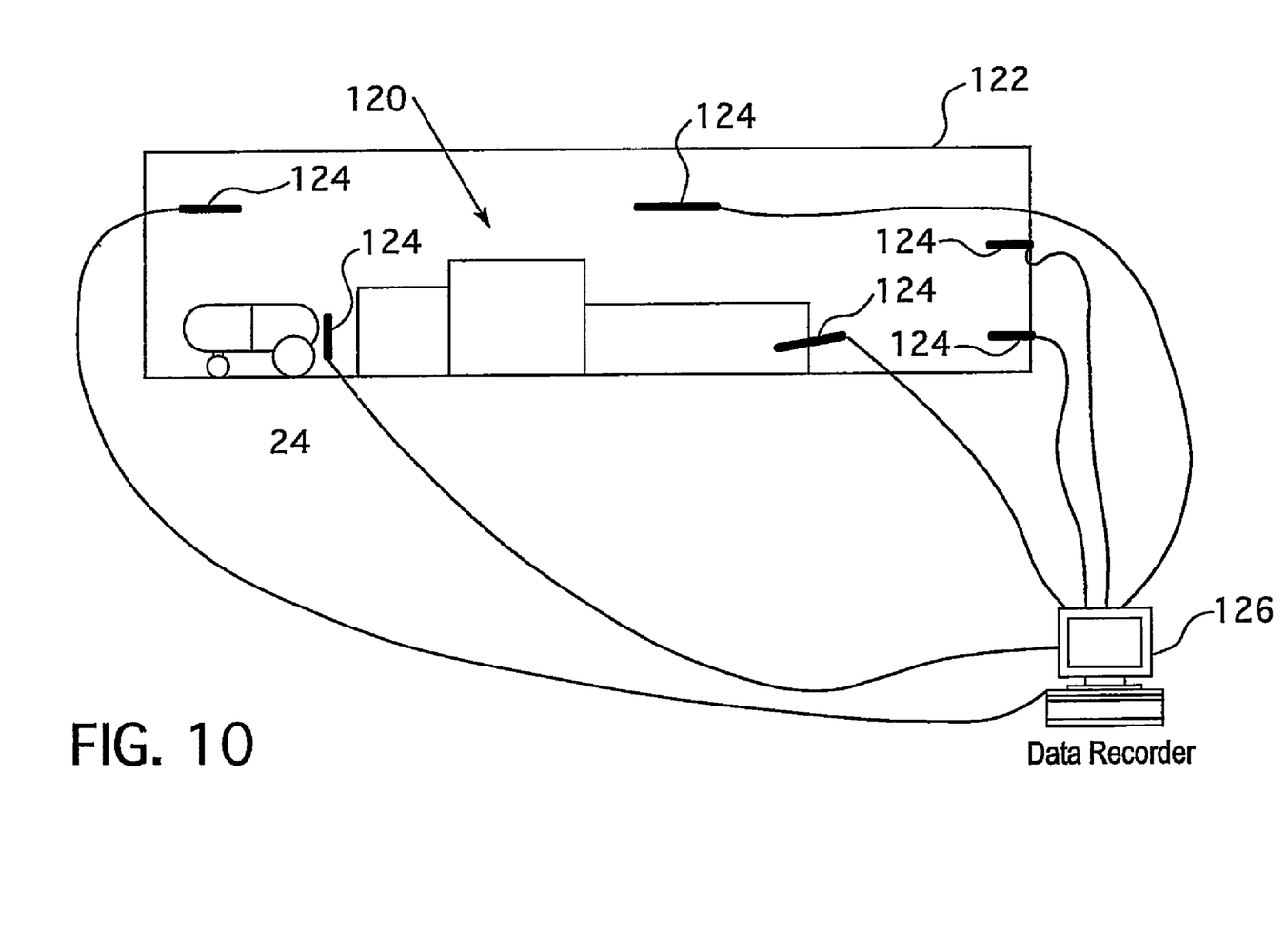
FIG. 10 is a diagram of a system for treating a room according to various embodiments of the present invention.

FIG. 9 is a flowchart of the process for eradicating bed bugs and other pests using the heater 24 according to various embodiments of the present invention. At step 100, the room to be treated is prepared. As part of the room preparation process, with reference to FIG. 10, furniture and other large items 120 in the room 122, such as the mattress(es), box spring(s), appliance(s), etc., are moved away from the walls of the room 122, to the extent possible, stacked and arranged so that heated air from the heater 24 can flow evenly around, over, and under the items 120. In addition, sprinkler heads, if any, in the room may be modified so that they are deactivated—that is, so that they do not go off during the heat treatment process. The sprinkler heads may be modified, for example, by draining the sprinkler system, removing the sprinkler heads and putting plugs in their place, using different sprinkler heads that are not activated at the temperatures to be used in the treatment process (e.g., not activated at temperatures below 130° F.), and/or adjusting the sprinkler heads so that they are not activated at the temperatures to be used in the treatment process. In addition, as part of the room preparation process, the smoke detection system in the room, may be modified so it is deactivated, such as by removing its power source or turning it off.

In addition, electronic devices in the room that may be sensitive to high temperatures, such as computers, televisions, radio, etc., may be removed or, if left in the room, disconnected from power. Similarly, the refrigerator (if any) in the room may be unplugged. Also, the air conditioner (if any) should be turned off. Indeed, the air conditioner preferably should be turned off the twelve to twenty-four hours prior to the heat treatment to reduce the time it will take to heat the ambient air in the room to the lethal temperature.

In addition, the window(s) and other openings in the room (except the door at this point) should be tightly closed. Preferably, no other external room sealings are needed. That is, in contrast to prior heat treatment processes where the treatment area is tented so that the room is enclosed in a tent or other sealant, external room sealings do not need to be used according to various embodiments of the heat treatment process of the present invention.

In addition, as part of the room preparation process, the heater 24 is placed in the room. According to various embodiments, the separate sections 10, 12 of the heater 24 may be transported separately to the room, and then the two sections 10, 12 may be connected to form the functional heater 24 once the two sections 10, 12 are transported to the room. Using two separate sections 10, 12 obviates the need to carry both sections 10, 12 at once to the room to be treated, which may be difficult in situations where the room to be treated is on an upper floor of a high-rise building. Multiple heater sections also allows for customization of the heater coil configurations, as described above.

At step 102, a number of temperature-sensing probes 124 are placed throughout the room. Preferably, at least six temperature-sensing probes 124 are placed throughout the room 122. For example, one may be placed at each of the following locations: air intake for the heater 24 (e.g., close to grill 42, see FIG. 6); one or more ambient air locations, preferably approximately six feet from the floor; high and low locations into the wall void of the wall supporting the headboard of the bed, (as well as other wall, ceiling and floor void spaces); in the mattress; and inside the core of a wood member of the room, such as a wooden piece of furniture in the room. Alternatively, one or more temperature-sensing probes may be placed in scrap wood of similar thickness to furniture of the room to avoid having to drill holes in the furniture for a probe. It should be noted that the step of locating the temperature-sensing probes may be performed after preparation of the room (step 100), or it may be performed while the room is being prepared.

At step 104, the temperature-sensing probes 124 are communicatively connected to an electronic data recorder 126. The data recorder 126 may be include a processor and a memory, and may be located inside or preferably outside of the room being treated. The temperature-sensing probes 124 may be wired and/or wirelessly connected to the data recorder 126. The data recorder 126 may receive the temperature readings from the various temperature-sensing probes 124 and record the data in its memory along with a timestamp for when the readings where taken or recorded. According to various embodiments, the data recorder 126 may be an ECR1 Paperless Recorder from Chromalox, Inc., or any other suitable electronic data recorder. In addition, numerous monitoring points, such as fifteen (15) to twenty-five (25) monitoring points, may be identified throughout the room and marked with adhesive stickers or other identifiers, which preferably are numbered to aid in accurate data collection. As described below, the surface temperatures of these locations may be measured with a handheld infrared thermometer from time to time during the heating process, such as every hour for the first four hours and every two hours afterward for the duration of the heat remediation service according to various embodiments.

At step 106, the heater 24 is turned on. According to various embodiments, first the fan 16 is turned on, and then the heating coils 22 of the heater 24. In some instances, additional ventilation of the room may be needed. In these circumstances, additional, separate fans units may be placed throughout the room. These fan units may be turned on prior to activation of the heater coils 22. In addition, if airflow from the heater 24 is directly on walls or furniture, the heater 24 may be repositioned or reflective insulation may be used to protect the walls and furniture. One or more external generators (not shown) may be used to power components of the heater 24, such as the motor 16, for example. In addition or alternatively, components of the heater 24 (such as the motor 16 for the heater coils 22) may be electrically powered from conventional wall outlets, air conditioning, and/or electrical appliance power outlets in the room, as described above. In addition, for example, a generator may be used to power one power circuit (such as the power circuit for the fan motor) and wall outlets in the room or otherwise in the building may be used to power the power circuits for the heater coils 22.

At step 108, the operator(s) leaves the room 122. The door is preferably closed and sealed to retain the hot air inside the room 122.

At step 110, the room is heated to the lethal temperature, which is preferably in the range of 120° F. to 130° F. for ambient air and 111° F. to 113° F. for voids in the walls, etc. in the treatment area. The temperature readings from the temperature-sensing probes, collected by the data recorder, may be monitored to determine when the room temperature reaches the lethal level. The temperature readings may be collected periodically, such as every five minutes to every two hours, for example, during the heating process. The heating of the room 122 to the lethal level may be relatively gradual, such as over a period of hours, because furniture and cabinets made of laminated components are preferably heated slowly over several hours to prevent the laminated surfaces from expanding faster than the core and breaking the adhesive bonds.

Throughout the heating process, the temperature readings may be monitored by the temperature sensing probes 124, whose temperature data is collected and stored by the data recorder 126. In addition, a human operator may enter the room from time to time during the heating process to spot check surface temperatures with, for example, an infrared thermometer to validate readings from the temperature-sensing probes 124 (which may be thermocouples), and to visually inspect the room for damage and bed bug activity. Preferably, the human operator takes and records the surface temperature readings at the pre-identified and pre-marked monitoring points, described above. Such human observation may take place every hour for the first four hours of the heating process, and then every two hours thereafter.

Once these threshold temperatures are reached, the room is heated for a period of time (the treatment time period), such as two hours, three hours, or more. Preferably, the threshold temperature is 113° F. for all void and interior structural temperatures, and the preferably treatment time period is four hours. Accordingly, once all void and interior structural temperatures have exceeded the threshold temperature (e.g., 113° F.) for the treatment time period (e.g., four hours), at step 112, the heater 24 may be turned off. First, the heater coils 22 may be turned off, but the fan 16, and any other fan units in the room, preferably should run for a minimum of ten minutes after the heater coils 22 are turned off to help dissipate the heat. As even cooling of the room is important to prevent damage, the room air conditioner should not be turned on at this point, but rather preferably is not turned on until the day following the treatment.

According to various embodiments, once the surface temperatures of the heater coils 22 drops below 105° F., the heater 24 and temperature monitoring equipment may be removed from the room.

Various embodiments of the present invention are also directed to a kit that can be used to eradicate bed bugs and other pests through heat. The kit may comprise: (i) the two sections 10, 12 of the heater 24; (ii) a number of temperature sensing probes 124; and (iii) the data recorder 126 (along with any required software). In addition, the kit may comprise means for communicatively connecting the temperature-sensing probes 124 and the data recorder 126. For example, the kit may comprise wires if the temperature-sensing probes 124 are wired to the data recorder 126. If the temperature-sensing probes 124 wirelessly communicate with the data recorder 126, the data recorder 126 may comprise an internal or external radio for receiving the wireless temperature reading data from the temperature-sensing probes 124. According to additional embodiments, the kit may also comprise one or a number of electric generators for powering one of the power circuits of the heater 24. In addition, the kit may comprise an infrared thermometer to measure temperatures in the room. In addition, the kit may comprise multiple different first (or heater) sections 10 of the heater 24 so that the operator has the option of which heater section 10 to use depending on the available power sources.

While several embodiments of the present invention have been described herein, it should be apparent that various modifications, alterations, and adaptations to those embodiments may occur to persons skilled in the art. For example, certain steps of FIG. 9 may be performed in different orders or at the same time. It is therefore intended to cover all such modifications, alterations, and adaptations without departing from the scope and spirit of the present invention as defined by the appended claims.

What is claimed is:

1. A method of treating pests in a room of a multi-room building, the method comprising:
 preparing the room for treatment, wherein preparing the room for treatment comprises fully closing one or more windows of the room;
 placing a plurality of temperature-sensing probes throughout the room, wherein the plurality of temperature-sensing probes are in communication with a data recorder;
 connecting a first heater section to a second, separate, heater section to form an electric heater, wherein the first heater section comprises a plurality of electrically energized heater coils, wherein the second heater section comprises a fan and a fan motor, and wherein the electric heater further comprises a power box comprising:
  a first power circuit for receiving electric power from a first power source for powering the fan motor;
  a second power circuit for receiving electric power from a second source for powering a first portion of the heater coils; and
  a third power circuit for receiving electric power from a third source for powering a second portion of the heater coils;
 heating the room, with the electric heater, such that ambient air in the room is heated to at least 120° F. for a treatment time period and such that interior structural voids for the room exceed 111° F. for the treatment time period, wherein the treatment time period is at least two hours; and
 during the heating, recording and storing, by the data recorder, temperature readings from the plurality of temperature-sensing probes.

2. The method of claim 1, further comprising powering the electric heater with an electric generator.

3. The method of claim 1, wherein the electric heater comprises one or more lockouts that prevent powering of the heater coils unless the fan motor is energized.

4. The method of claim 1, wherein the electric heater further comprises one or more lockouts that prevent the first and second portions of the heater coils from being energized unless the fan motor is energized.

5. The method of claim 4, wherein the electric heater further comprises:
 a first switch for selectively turning on and off the second power circuit; and
 a second switch for selectively turning on and off the third power circuit.

6. The method of claim 1, wherein preparing the room comprises:
 modifying a water sprinkler system for the room so that the water sprinkler system is not activated during the heating; and
 deactivating a smoke detector for the room.

7. The method of claim 1, wherein connecting the first heater section to the second heater section comprises locating the fan such that the fan pulls ambient air for heating by the electric heater.

8. The method of claim 1, wherein connecting the first heater section to the second heater section comprises securing the first heater section to the second heater section.

9. The method of claim 8, wherein securing the first heater section to the second heater section comprises bolting the first heater section to the second heater section.

10. The method of claim 8, wherein the first heater section comprises a first housing and the second heater section comprises a second housing, and wherein securing the first heater section to the second heater section comprises physically attaching the first housing to the second housing.

11. The method of claim 8, wherein the electric heater further comprises an additional heater section.

12. The method of claim 11, wherein the additional heater section comprises a fan.

13. The method of claim 1, further comprising powering the electric heater with an electric generator, and wherein:
    connecting the first heater section to the second heater section comprises securing the first heater section to the second heater section; and
    connecting the first heater section to the second heater section comprises locating the fan such that the fan pulls ambient air for heating by the electric heater.

14. A method of treating pests in a room of a multi-room building, the method comprising:
    preparing the room for treatment, wherein preparing the room for treatment comprises fully closing one or more windows of the room;
    placing a plurality of temperature-sensing probes throughout the room, wherein the plurality of temperature-sensing probes are in communication with a data recorder;
    within an interior of the room, arranging a first heater section and a second, separate, heater section, wherein the first heater section comprises a first housing, a fan, and a fan motor, wherein the second heater section comprises a second housing and a plurality of electrically energizable heater coils, and wherein arranging the heater sections comprises locating the first heater section such that the fan increases air movement over a portion of the heater coils;
    securing the first heater housing of the arranged first heater section to the second heater housing of the arranged second heater section to form an electric heater assembly, wherein the electric heater assembly further comprises:
        a first power circuit for receiving electric power from a first source for powering a first portion of the heater coils; and
        a second power circuit for receiving electric power from a second source for powering a second portion of the heater coils;
    heating the room, with the electric heater assembly, such that ambient air in the room is heated to at least 120° F. for a treatment time period and such that interior structural voids for the room exceed 111° F. for the treatment time period, wherein the treatment time period is at least two hours; and
    during the heating, recording and storing, by the data recorder, temperature readings from the plurality of temperature-sensing probes.

15. The method of claim 14, further comprising powering the electric heater assembly with an electric generator.

16. The method of claim 14, wherein the electric heater assembly further comprises a power box comprising the first power circuit and the second power circuit.

17. The method of claim 16, wherein the power box further comprises a third power circuit for receiving electric power from a third power source for powering the fan motor, and wherein the power box comprises one or more lockouts that prevent powering of the heater coils unless the fan motor is energized.

18. The method of claim 16, wherein the power box further comprises a third power circuit for receiving electric power from a third power source for powering the fan motor, and wherein the power box comprises one or more lockouts that prevent the first and second portions of the heater coils from being energized unless the fan motor is energized.

19. The method of claim 14, wherein the second power circuit is rated at a higher voltage than the first power circuit.

20. The method of claim 14, wherein the electric heater assembly further comprises:
    a first switch for selectively turning on and off the first power circuit; and
    a second switch for selectively turning on and off the second power circuit.

21. The method of claim 14, wherein preparing the room comprises:
    modifying a water sprinkler system for the room so that the water sprinkler system is not activated during the heating; and
    deactivating a smoke detector for the room.

22. The method of claim 14, wherein securing the first heater section to the second heater section comprises bolting the first heater section to the second heater section.

23. The method of claim 14, wherein the electric heater assembly comprises an additional heater section.

24. The method of claim 23, wherein the additional heater section comprises a fan.

* * * * *